(12) United States Patent
Schumacher

(10) Patent No.: US 10,259,293 B2
(45) Date of Patent: Apr. 16, 2019

(54) AIR FILTER FOR A VENTILATION DEVICE OF A MOTOR VEHICLE

(71) Applicant: Daimler AG, Stuttgart (DE)

(72) Inventor: Eric Schumacher, Bingen (DE)

(73) Assignee: Daimler AG, Stuttgart (DE)

( * ) Notice: Subject to any disclaimer, the term of this patent is extended or adjusted under 35 U.S.C. 154(b) by 88 days.

(21) Appl. No.: 15/300,631

(22) PCT Filed: Mar. 31, 2015

(86) PCT No.: PCT/EP2015/000687
§ 371 (c)(1),
(2) Date: Sep. 29, 2016

(87) PCT Pub. No.: WO2015/149934
PCT Pub. Date: Oct. 8, 2015

(65) Prior Publication Data
US 2017/0174050 A1    Jun. 22, 2017

(30) Foreign Application Priority Data

Apr. 1, 2014    (DE) ........................ 10 2014 004 740

(51) Int. Cl.
*B60H 3/06* (2006.01)
*B01D 46/00* (2006.01)
(Continued)

(52) U.S. Cl.
CPC ....... *B60H 3/0616* (2013.01); *B01D 46/0006* (2013.01); *B01D 46/10* (2013.01);
(Continued)

(58) Field of Classification Search
CPC ........ B01D 46/42; B01D 45/00; B01D 46/00; B01D 46/0006; B01D 46/0009;
(Continued)

(56) References Cited

U.S. PATENT DOCUMENTS 1,387,542 A * 8/1921 Healey ...................... E06B 3/99
                                                              403/347
1,537,673 A * 5/1925 Hillyard ................. B65H 16/06
                                                              242/565
(Continued)

FOREIGN PATENT DOCUMENTS

CN    101164653 A     4/2008
CN    101555843 A    10/2009
(Continued)

OTHER PUBLICATIONS

Japanese Office Action issued in Japanese counterpart application No. 2016-560346 dated Apr. 10, 2018, with partial English translation (Six (6) pages).

(Continued)

*Primary Examiner* — Duane Smith
*Assistant Examiner* — Minh Chau T Pham
(74) *Attorney, Agent, or Firm* — Crowell & Moring LLP

(57) ABSTRACT

An air filter for a ventilation device of a motor vehicle is disclosed. The air filter has a planar extension along which the air filter is able to be inserted into a flow area of the ventilation device transversely relative to a flow direction and has a filter medium arranged along its planar extension. The filter medium is bordered at least in certain regions by at least one frame wall. The frame wall has at least one section which is able to be brought into engagement with guide elements of the ventilation device in order to guide the air filter during insertion into the flow area. The section is a notch on an edge of the frame wall and is formed with an undercut relative to the edge such that the air filter is able to be braced transversely relative to the insertion direction during insertion in two directions.

7 Claims, 2 Drawing Sheets

(51) Int. Cl.
  *B01D 46/10* (2006.01)
  *B01D 46/52* (2006.01)

(52) U.S. Cl.
  CPC ........ *B01D 46/521* (2013.01); *B01D 2279/35* (2013.01); *B60H 2003/065* (2013.01)

(58) Field of Classification Search
  CPC ........ B01D 2265/024; B01D 2265/026; B01D 2265/025; F02M 35/024; F02M 35/02416; E02F 9/0866
  USPC ...... 55/385.3, 480, 493, 502, 521, 495, 482, 55/497, 511, 481, 506; 123/198 E
  See application file for complete search history.

(56) References Cited

U.S. PATENT DOCUMENTS

| | | | | |
|---|---|---|---|---|
| 3,823,533 | A * | 7/1974 | Alverson | B01D 46/10 55/481 |
| 7,264,644 | B2 * | 9/2007 | Nicholas | B01D 46/0002 454/187 |
| 7,833,300 | B2 * | 11/2010 | Taniuchi | E02F 9/0866 123/198 E |
| 8,192,533 | B2 * | 6/2012 | Kinney | B01D 46/0002 55/385.3 |
| 8,784,527 | B2 * | 7/2014 | Jung | F02M 35/02416 123/198 E |
| 9,126,131 | B2 | 9/2015 | Arold | |
| 2003/0051453 | A1 * | 3/2003 | Moreau | F02M 35/024 55/385.3 |

FOREIGN PATENT DOCUMENTS

| | | |
|---|---|---|
| CN | 102441305 A | 5/2012 |
| CN | 102580424 A | 7/2012 |
| DE | 10 2005 048 841 B3 | 7/2007 |
| DE | 10 2010 024 093 A1 | 12/2011 |
| DE | 10 2010 053 758 A1 | 6/2012 |
| DE | 10 2012 005 188 A1 | 12/2012 |
| DE | 10 2012 012 669 A1 | 1/2013 |
| EP | 2 463 009 A1 | 6/2012 |
| JP | 2008-230565 A | 10/2008 |
| RU | 33 905 U1 | 11/2003 |
| RU | 67 026 U1 | 10/2007 |

OTHER PUBLICATIONS

Russian Search Report issued in Russian counterpart application No. 2016142724/11(068387) dated Dec. 13, 2017 (Six (6) pages).
Japanese Office Action issued in Japanese counterpart application No. 2016-560346 dated Sep. 19, 2017, with partial English translation (Six (6) pages).
PCT/EP2015/000687, International Search Report dated Aug. 4, 2015 (Two (2) pages).

\* cited by examiner

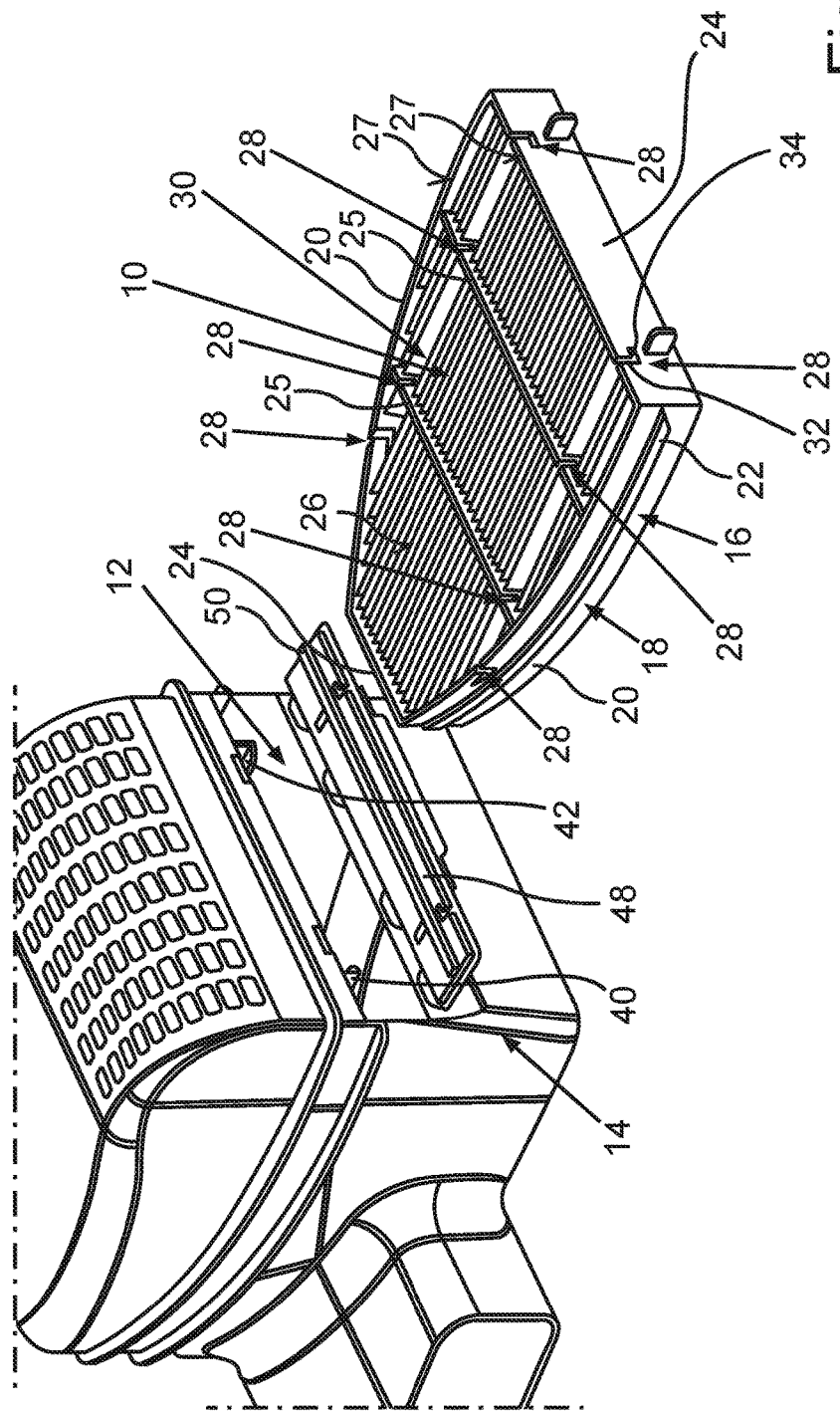

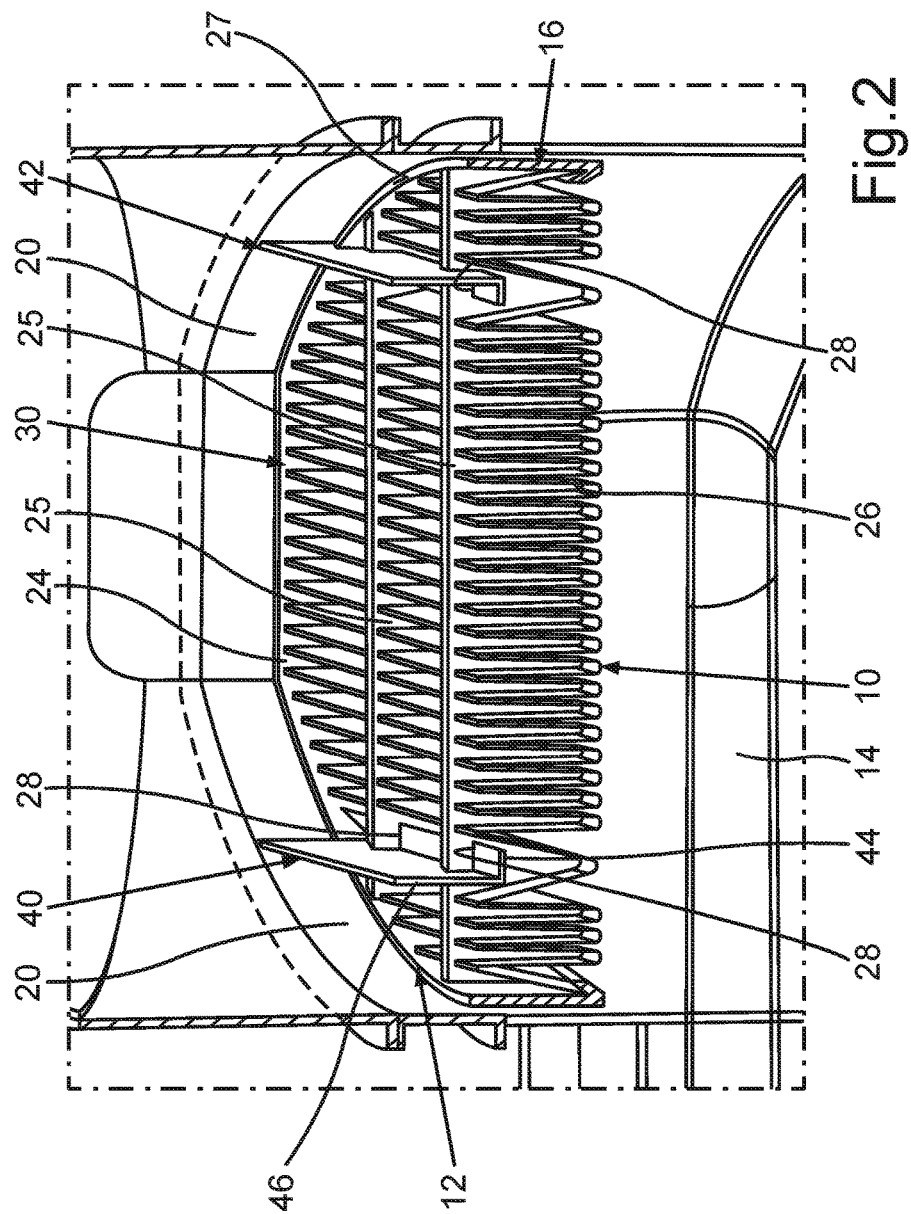

AIR FILTER FOR A VENTILATION DEVICE OF A MOTOR VEHICLE

BACKGROUND AND SUMMARY OF THE INVENTION

The invention relates to an air filter for a ventilation device of a motor vehicle. The invention furthermore relates to an arrangement of such an air filter in a flow area of such a ventilation device.

It can be gleaned as known from DE 10 2005 048 841 B3 to insert an air filter having a planar, drawer-like or cassette-like extension along its extension direction or transversely relative to a flow direction into a flow area of the ventilation device. Here, the air filter comprises a filter medium arranged along its planar extension, the filter medium being bordered, in the present case, peripherally by a frame wall. In this instance, several sections are taken out of the frame wall, which are able to be brought into engagement with guide elements in the form of guiding pins of the ventilation device in order to guide the air filter when it is inserted into the flow area.

The guiding pins thus push through the filter housing and therefore require an elaborate design of the air filter. In order to additionally obtain a sufficient guide length, it is necessary for respective guide domes to adjoin the corresponding sections of the filter housing, the guide domes being able to receive the guiding pins. This also requires a more elaborate design of the air filter.

The object of the present invention is therefore to create an air filter, as well as an arrangement of the type referred to at the beginning, which enables as reliable and yet as simple a guiding as possible of the air filter when it is inserted into the receiving shaft.

In order to create an air filter of the type referred to at the beginning which enables, in as reliable and yet as simple a manner as possible, an appropriate guiding option for introducing the air filter in the receiving shaft, or for removing it therefrom, provision is made according to the invention for the section to be designed as a notch on an edge of the frame wall and to be formed with an undercut relative to the edge, whereby the air filter is able to be braced transversely relative to the insertion direction when being inserted in two directions. As a consequence, provision is made according to the invention for the at least one section to be designed to open out towards an edge on an outer side or a broad side of the frame wall of the air filter. Such a section that opens out towards the edge of the frame wall is conventionally known as a notch. This notch may be introduced into the frame wall by cutting, as well as by molding, casting or by way of another method, or may be provided on the frame wall in another way.

With this notch, it is possible to have corresponding guide elements run on sides of the receiving shaft, for example over a considerable portion of or the entire length along the filter, without the air filter here having to be pushed through by a guide element, for example a guide rail. The guide rail can therefore run substantially on the outer side, for example the broad side, of the filter housing, such that, for example, no extra recesses have to be provided within the filter medium. This enables a simple design of the air filter by only one or a plurality of notches having to be provided. In addition, a particularly favorable guiding option hereby arises since, as explained above, the corresponding guide element can extend in a simple manner on sides of the ventilation device over the complete length of the air filter.

Here, the notch is formed with an undercut relative to the edge of the frame wall, such that the air filter is able to be braced transversely or perpendicularly relative to the insertion direction when being inserted in the two spatial directions. The notch is thereby formed in such a way that a movement of the air filter can be achieved substantially in only the insertion direction or the extraction direction.

A particularly simple and yet easy-to-guide air filter can be achieved by the notch and therefore the corresponding guide element on sides of the ventilation device also having an angular shape or a T-shape in their cross-section.

As an alternative to this, it is in particular also conceivable to form the notch as a narrow slot having a wide bay in the region that is separated from the edge. Such a section that has, for example, been configured in the manner of a keyhole, also enables a good and smooth guiding of the air filter.

In a further embodiment of the invention, several sections are arranged congruently in the insertion direction, whereby they are able to be brought into engagement with a single guide element during insertion. The guide element on sides of the ventilation device can therefore, for example, be designed as a linearly-running guide rail which is configured with corresponding simplicity and along which a smooth guiding of the air filter can be achieved.

An embodiment in which the filter medium is designed as a folded filter fleece and is fastened to the frame walls at least in certain regions is furthermore advantageous. Fastening in certain regions is particularly conceivable because separate frame walls are only formed in the region transverse to the folding and the further frame walls are themselves able to be formed by the folded filter fleece.

Finally, it has been shown to be advantageous if respective bent edges of a fold of the filter medium are aligned in the insertion direction. There hereby arises a correspondingly inherently rigid filter medium that is robust during insertion.

The advantages referred to above in connection with the air filter according to the invention therefore apply the same way for the arrangement.

Further advantages, features and details of the invention arise from the following description of a preferred exemplary embodiment as well as with the aid of the drawings.

BRIEF DESCRIPTION OF THE DRAWINGS

FIG. 1 is a perspective view of an air filter and a ventilation device of a motor vehicle in whose receiving shaft the air filter is able to be arranged, wherein the air filter comprises a filter housing having respective guide recesses for connecting the air filter to two corresponding guide elements arranged on the receiving shaft, along which the air filter is able to be inserted into the receiving shaft or is able to be extracted therefrom, wherein the respective guide recesses are formed to open out towards an outer side of the filter housing; and FIG. 2 is a perspective front view of the arrangement of the air filter according to FIG. 1 that has been completely inserted into the receiving shaft.

DETAILED DESCRIPTION OF THE DRAWINGS

FIGS. 1 and 2 show, in a perspective view and in a perspective front view, an air filter 10 having a planar extension, along which it is able to be inserted, in a manner that is to be described in greater detail, into a flow area 12 of a ventilation device 14. Here, the ventilation device 14 is part of a heating and/or air conditioning unit of a motor vehicle and comprises an AC or air filter cabinet in the region of which the flow area 12 is provided for the air filter 10.

As can be recognized from FIG. 1, the air filter 10 presently has a completely peripheral frame wall 16 which has frame wall parts 20 on respective narrow sides 18, the frame wall parts running in an arcing and non-parallel manner relative to one another. Corresponding sealing elements 22 are provided on the outer side of these frame wall parts 20, the sealing elements serving to prevent unfiltered, leaking air from flowing over between the respective frame wall parts 20 and respective corresponding walls of the flow area 12.

The frame wall 16 furthermore comprises two frame wall parts 24 arranged in parallel to each other, which, together with the frame wall parts 20, form the peripheral frame wall 16. Moreover, two central wall parts 25 are formed as ribs which connect the frame wall parts 20 to each other and, in the present instance, run parallel to the frame wall parts 24. The frame wall 16 or the frame wall parts 20, 24 peripherally border, in the present instance, a filter medium 26, by means of which the air flowing through the ventilation device 14, for example fresh air, is able to be purified. The filter medium 26 is herein designed presently as a folded filter fleece and is fastened to the frame wall parts 20, 24 of the frame wall 16 at least in certain regions. Respective bent edges of a fold of the filter medium 26 are herein formed in the insertion direction.

It is to be considered as being included in the scope of the invention that the respective frame wall parts 20 can also be formed by the folded filter fleece 26 itself, in particular in the folding direction. In this context it is also conceivable for at least one section or one notch 28 to be introduced directly into the filter fleece as a frame wall part.

The filter medium 26 can of course alternatively also be formed in particular as a block filter made from foam or a bulk material.

As can now be seen in particular from FIG. 2, eight sections 28 are provided both in the frame wall parts 24 of the frame wall 16, as well as in the wall parts 25 acting as ribs, the sections each being designed as a notch on an edge 27 of the frame wall 16 or the respective frame wall parts 24 or wall parts 25 and being formed with an undercut relative to the edge 27. Such a notch 28 is, in the present instance, in particular produced by cutting or by molding, so for example by stamping or similar. Nevertheless, any other technology, in particular a casting method, is also conceivable.

The special feature of the respective notch 28 is to be seen in that this is designed to open out towards the respective edge 27 of the corresponding frame wall part 24 or wall part 25, or towards an outer side, in this case a broad side 30 of the air filter 10. Each of the sections or notches 28 is presently formed overall in a roughly angular or L-shaped manner, and comprises an arm 32 which is formed to open out towards the edge 27. In the present case, an arm 34 that is arranged approximately perpendicular to this arm 32 adjoins the arm, the arm 34 consequently extending approximately parallel to the edge 27.

It is to be considered as being included in the scope of the invention that the arm 32 and the arm 34 can also form a substantially T-shaped cross-section of the respective notch 28. It is also conceivable for the respective section 28 to be formed as a narrow slot having a wide bay in the region that is separated from the edge 27. However, what is essential in all embodiments is that the respective notch 28 is designed with an undercut relative to the edge 27 towards which the notch opens out, whereby the air filter 10 is able to be braced transversely relative to the insertion direction or extraction direction when being inserted in two directions.

As can be furthermore seen in conjunction with FIG. 2, which shows the arrangement of the air filter 10 within the flow area 12 of the ventilation device 14 in a perspective front view, four respective left and four respective right sections or notches 28 are presently arranged in the insertion direction congruently within the corresponding frame wall parts 24 or wall parts 25, whereby they are, or are able to be, brought into engagement with a respective, rail-like guide element or guide rail 40, 42 when the ventilation device 14 is inserted into the flow area 12. Both guide rails 40, 42 are consequently formed accordingly in a straight line. It is hereby possible to insert the air filter 10 into the flow area 12 of the ventilation device 14, or to extract it therefrom, in a simple manner by means of the notches 28 along the guide rails 40, 42. It would of course also be conceivable here to introduce curved guide elements in order, for example, to achieve a corresponding movement path of the air filter 10 when the ventilation device 14 is inserted into or removed from the flow area 12.

As can furthermore be seen from FIG. 2, the respective guide elements or guide rails 40, 42 on sides of the ventilation device 14 are adapted in their cross-section to the respective notches 28 and are formed substantially in an L-shape or at an angle with respective arms 44 and 46.

Due to the design of the arms 32 and 34 of the notches and the corresponding design of the arms 44 and 46 of the respective guide rail 40, 42, the air filter 10 is able to be braced transversely relative to the insertion direction, more precisely in the two spatial directions perpendicular to the insertion direction, during insertion and extraction. Therefore, only an insertion or extraction of the air filter 10 is possible.

As can finally be seen from FIG. 1, a corresponding flap 48 is provided within the housing of the ventilation device 14, which is shown in the open condition. A corresponding sealing element 50 is located on this flap 48, by means of which this is sealed against the corresponding frame wall part 24 of the frame wall 16 in the closed condition.

The invention claimed is:

1. An air filter for a ventilation device of a motor vehicle, comprising:
a planar extension along which the air filter is insertable into a flow area of the ventilation device transversely relative to a flow direction;
a filter medium disposed along the planar extension, wherein the filter medium is bordered in a region by a frame wall, wherein the frame wall has a section which is engageable with a guide element of the ventilation device to guide the air filter during insertion into the flow area;
wherein the section is a notch on an edge of the frame wall, wherein the notch includes a first arm and a second arm, wherein the first arm opens out towards the edge and the second arm is disposed perpendicular to the first arm and extends parallel to the edge, and wherein the air filter is braceable transversely relative to an insertion direction in two spatial directions perpendicular to the insertion direction when being inserted; and
a plurality of sections, wherein the plurality of sections are disposed congruently in the insertion direction, wherein the plurality of sections are engageable with the guide element, wherein each of the plurality of sections is disposed on a respective rib disposed within an area defined by the frame wall, wherein the respective ribs extend perpendicular to the insertion direction, wherein each of the plurality of sections includes a first arm and a second arm, wherein the first arm opens out towards an edge of the rib and the second arm is disposed perpendicular to the first arm and extends parallel to the edge of the rib.

2. The air filter according to claim 1, wherein the section has an L-shape.

3. The air filter according to claim 1, wherein the section has a T-shape.

4. The air filter according to claim 1, wherein the section is a narrow slot with a wide bay in a region that is separated from the edge.

5. The air filter according to claim 1, wherein the filter medium is a folded filter fleece and is fastened to frame wall parts of the frame wall at least in regions.

6. The air filter according to claim 1, wherein bent edges of a fold in the filter medium are aligned in the insertion direction.

7. A ventilation arrangement of a motor vehicle, comprising:
   an air filter; and
   a ventilation device;
   wherein a planar extension of the air filter is disposed in a flow area of the ventilation device transversely relative to a flow direction;
   wherein a filter medium is disposed along the planar extension, wherein the filter medium is bordered in a region by a frame wall, and wherein the frame wall has a section which is engaged with a guide element of the ventilation device;
   wherein the section is a notch on an edge of the frame wall, wherein the notch includes a first arm and a second arm, wherein the first arm opens out towards the edge and the second arm is disposed perpendicular to the first arm and extends parallel to the edge, and wherein the air filter is braced transversely relative to an insertion direction in two spatial directions perpendicular to the insertion direction;
   wherein the guide element of the ventilation device has a same shaped cross-section as the notch;
   wherein a plurality of sections are disposed congruently in the insertion direction, wherein the plurality of sections are engageable with the guide element, wherein each of the plurality of sections is disposed on a respective rib disposed within an area defined by the frame wall, wherein the respective ribs extend perpendicular to the insertion direction, wherein each of the plurality of sections includes a first arm and a second arm, wherein the first arm opens out towards an edge of the rib and the second arm is disposed perpendicular to the first arm and extends parallel to the edge of the rib.

* * * * *